US006396163B1

(12) United States Patent
Sugiura et al.

(10) Patent No.: US 6,396,163 B1
(45) Date of Patent: May 28, 2002

(54) MOUNTING STRUCTURE FOR SENSOR IN INDUSTRIAL VEHICLE AND INDUSTRIAL VEHICLE

(75) Inventors: Kenji Sugiura; Toshikazu Kamiya; Kazuo Komori; Toshiyuki Takeuchi, all of Kariya (JP)

(73) Assignee: Kabushiki Kaisha Toyoda Jidoshokki Seisakusho, Kariya (JP)

( * ) Notice: Subject to any disclaimer, the term of this patent is extended or adjusted under 35 U.S.C. 154(b) by 0 days.

(21) Appl. No.: 09/384,750

(22) Filed: Aug. 27, 1999

(30) Foreign Application Priority Data

Aug. 28, 1998 (JP) .......................................... 10-243083
Aug. 28, 1998 (JP) .......................................... 10-243084

(51) Int. Cl.[7] .................................................. B60L 1/00
(52) U.S. Cl. ....................... 307/9.1; 307/10.1; 172/52.3
(58) Field of Search ........................... 307/10.1; 73/493, 73/494, 431; 174/50, 52.1, 52.3; 361/679, 748, 752, 807

(56) References Cited

U.S. PATENT DOCUMENTS 5,059,746 A * 10/1991 Hayes et al. .................. 174/51
5,333,701 A * 8/1994 Izumi .......................... 180/90
5,510,658 A * 4/1996 Nakayama ................. 307/10.1
5,941,336 A 8/1999 Saito et al. ................. 180/274
6,166,657 A * 12/2000 Mann ......................... 340/905

FOREIGN PATENT DOCUMENTS

| | | | | |
|---|---|---|---|---|
| DE | 40 21 035 C2 * | 6/1992 | ............ | B60K/5/12 |
| EP | 0 796 749 A2 | 9/1997 | ............ | B60G/9/02 |
| JP | 5-69083 | 9/1993 | ........... | B66F/9/075 |
| JP | 7-10581 | 2/1995 | ............ | F16F/15/08 |
| JP | 8-15005 | 1/1996 | ........... | G01H/11/08 |
| JP | 9-309309 | 12/1997 | ......... | B60G/17/005 |
| JP | 10-016702 | 1/1998 | ........... | B60R/21/32 |

OTHER PUBLICATIONS

EP 464598A—English translation of Abstract of above cited patent DE 40 21 035 C2.*

* cited by examiner

*Primary Examiner*—Josie Ballato
*Assistant Examiner*—Sharon Polk
(74) *Attorney, Agent, or Firm*—Morgan & Finnegan, L.L.P.

(57) ABSTRACT

A sensor is mounted in a vehicle such that the temperature of the sensor is not excessively raised or lowered and the sensor is water-proofed and protected from relatively low frequency vibrations transmitted from the vehicle body. A mounting structure includes an enclosure formed in the vehicle to form a closed space, the sensor, and a water proof case containing the sensor. The case is mounted to the vehicle within the enclosure. The sensor is connected to the case by high-damping rubber.

11 Claims, 12 Drawing Sheets

MOUNTING STRUCTURE FOR SENSOR IN INDUSTRIAL VEHICLE AND INDUSTRIAL VEHICLE

The present invention relates to a mounting structure for a sensor in an industrial vehicle such as a forklift.

A typical industrial vehicle such as a forklift has various sensors including a yaw rate sensor for detecting the state of the vehicle. The detection values of the sensors are used in various controls for optimizing the state of the vehicle. The sensors must be located in the body frame.

Some forklifts are used in environments of extreme temperatures such as in a factory having a furnace or in a refrigerator. In other words, the sensors in the body frame are also used in extreme temperatures.

For example, a yaw rate sensor has a temperature range in which the sensor functions properly. If the temperature of the sensor is out of the range, the sensor may fail to function properly. Even if the sensor temperature remains in the range, a significant temperature change of the sensor alters the sensitivity of the sensor, which changes the detection accuracy. Further, some yaw rate sensors are not waterproof and fail to function when rain or wash water is splashed on the sensor.

Accordingly, a sensor like a yaw rate sensor needs to be located such that the sensor is not excessively heated by engine heat and ambient heat. Also, a sensor must be prevented from getting wet with rain and wash water.

Vibrations generated in the body frame of a vehicle are transmitted to sensors in the body frame. Some sensors such as a yaw rate sensors are easily damaged by vibrations.

To prevent vibrations from being transmitted to sensors, some sensors are supported by rubber cushions. The cushions dampen vibrations from the body frame to the sensors thereby preventing violent vibrations from being transmitted to the sensors. The sensors are therefore less vulnerable to damage.

However, the degree of vibration damping depends on the frequency of vibrations generated in the body frame. The natural frequency of a vibrating system, which includes a rubber cushion and a sensor, is determined by the spring constant of the rubber cushion and the weight of the sensor. A frequency range lower than the natural frequency is referred to as a resonance region and a frequency range higher than the natural frequency is referred to as a damping region. If the vibration of the body frame is in the damping range, the rubber cushion damps the vibration from the body frame. If the vibration of the body frame is in the resonance region, the vibration in the sensor is stronger than the vibration of the body frame.

Every sensor has its own natural frequency. If the frequency of vibration from the body frame matches the natural frequency of the sensor, a strong resonance is generated in the sensor. The natural frequency of a sensor is relatively low and is sometimes in the resonance region of a vibrating system. In this case, the yaw rate sensor can be strongly vibrated when the vehicle is moving.

During assembly of a vehicle, bolts are often fastened with an impact wrench. A sensor may be fastened to the body frame with an impact wrench. The frequency of the vibrations transmitted from the impact wrench to the body frame is relatively low and is in the resonance region of the vibrating system using a rubber cushion. Thus, the vibration from the impact wrench cannot be damped by the rubber cushion. Therefore, when attaching a fragile sensor such as a yaw rate sensor to a body frame, the sensor may be broken by the impact wrench vibrations.

Further, if low frequency vibrations are generated in the body frame, the vibrations can cause resonance in a yaw rate sensor. This affects the detection accuracy of the yaw rate sensor. In other words, the yaw rates detected by the sensor may be erroneous.

SUMMARY OF THE INVENTION

Accordingly, it is a first objective of the present invention to provide a sensor mounting structure that permits the sensor to function accurately by preventing the temperature of the sensor from excessively increasing or decreasing due to engine heat and the ambient temperature and by preventing the sensor from becoming wet.

A further objective of the present invention is to provide an industrial vehicle that improves the accuracy of controls performed based on detection values of sensors mounted on the vehicle body frame.

A further objective of the present invention is to provide a sensor mounting structure for vehicles that protects the sensor from vibration transmitted from the body frame of a vehicle.

A further objective of the present invention is to provide a sensor mounting structure for vehicles that protects the sensor from vibrations having the same frequency as the natural frequency of the sensor.

Another objective of the present invention is to provide a sensor mounting structure for vehicles that protects the sensor from vibrations transmitted to a body frame from an impact wrench when the sensor is being installed in the body frame.

Another objective of the present invention is to provide a sensor mounting structure for vehicles that reduces detection errors of a yaw rate sensor that is supported on a body frame by a vibration damping member.

A further objective of the present invention is to provide a vehicle that improves the reliability of controls performed based on detection values of sensors supported on a body frame.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DETAILED DESCRIPTION OF THE PREFERRED EMBODIMENTS

A first embodiment of a mounting structure for a yaw rate sensor in a counterbalanced forklift 10 will now be described with reference to FIGS. 1 to 4.

Figure 2:
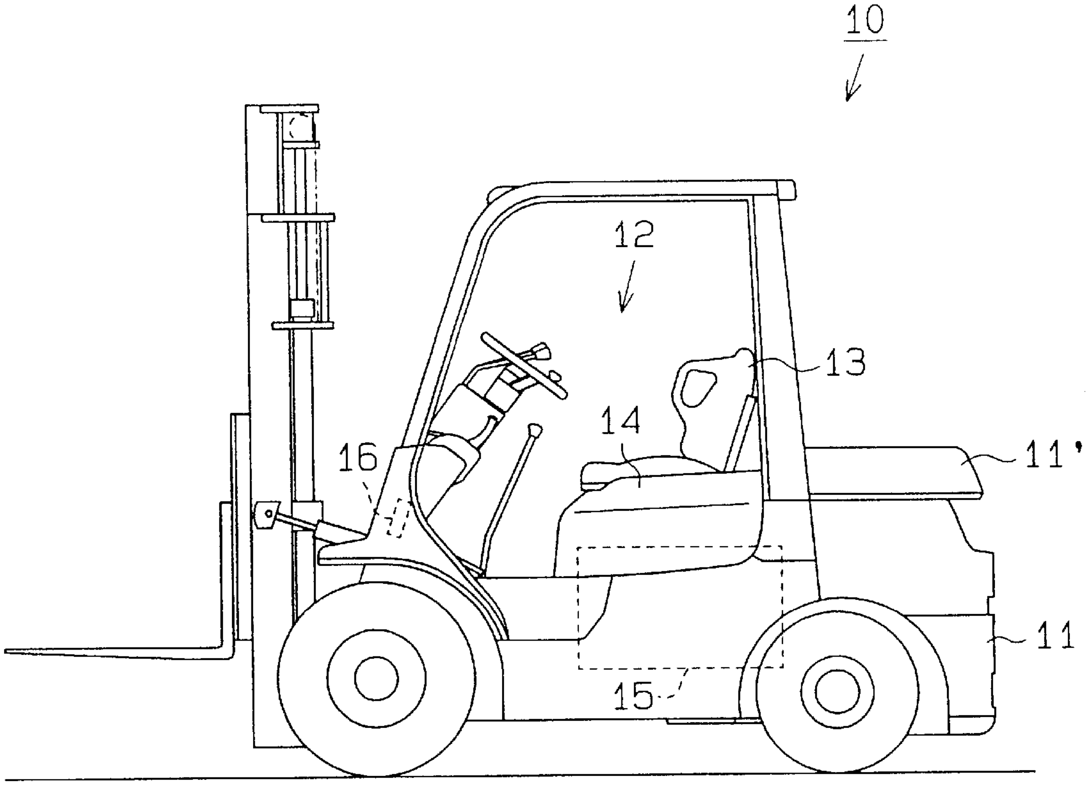
FIG. 2 is a side view of a forklift.

FIG. 2 illustrates a counterbalanced forklift 10. The forklift 10 is driven by an engine. A cab 12 is located at the center of a body frame 11. A seat 13 is located in the cab 12. A hood 14 is located below the seat 13 to house an engine 15. A control unit 16 is provided in the front part of the cab 12. A rear axle (not shown) of the forklift 10 is permitted to pivot in a rolling plane, or plane perpendicular to a shaft that pivotally supports the rear axle. When the vehicle 10 is steered to change directions, the control unit 16 computes lateral acceleration of the forklift 10 based on detected yaw rate and vehicle speed. The control unit 16 controls a lock that locks the rear axle against pivoting based on the computed lateral acceleration. In other words, the control unit 16 stabilizes the forklift 10 during turning.

Figure 3:
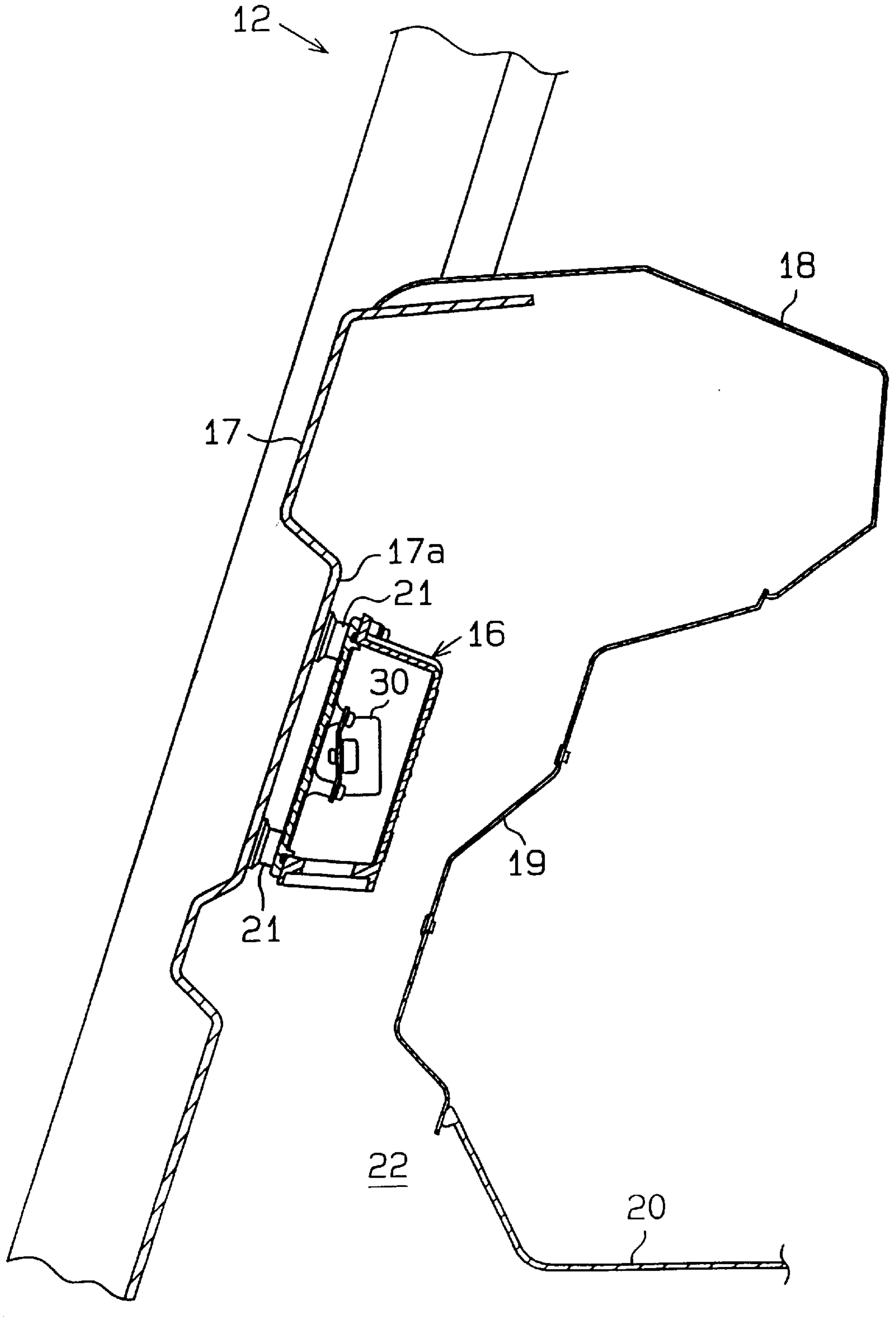
FIG. 3 is a cross-sectional view illustrating a front protector.

FIG. 3 illustrates a front part of the cab 12. The front part includes a front protector 17, an instrument panel 18, a kick board 19 and a toe board 20. The control unit 16 is attached to the rear surface 17*a* of the front protector 17 by support members 21. The control unit 16 is located in a space 22, which is substantially sealed from the outside by the instrument panel 18, the kick board 19 and the toe board 20. The front protector 17, the instrument panel 18, the kick board 19 and the toe board 20 form a covering member.

Figure 1:
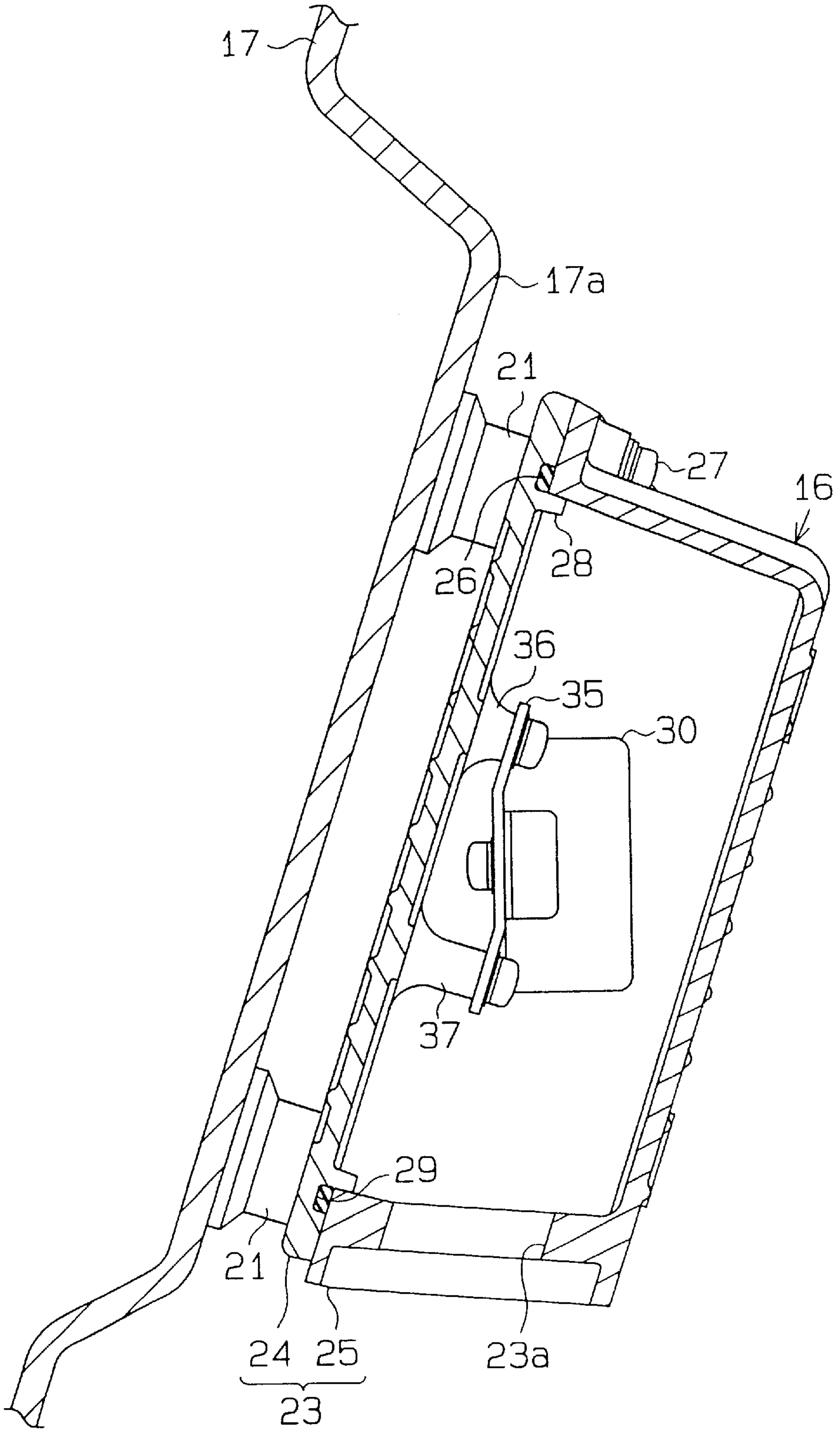
FIG. 1 is a cross-sectional view illustrating a yaw rate sensor mounting structure according to a first embodiment.
Figure 4:
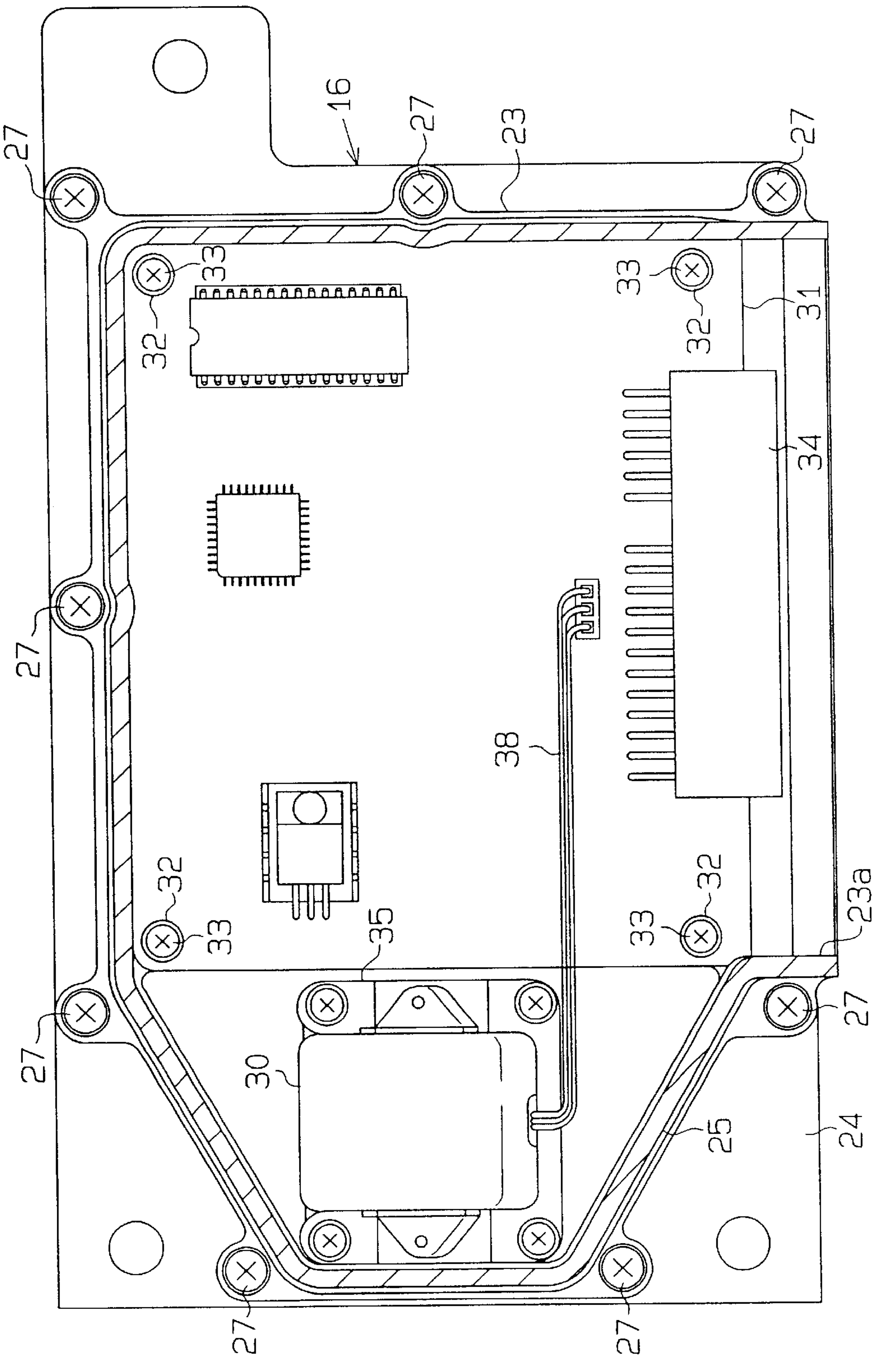
FIG. 4 is a cross-sectional view illustrating the control unit of FIG. 1.

As shown in FIGS. 1 and 4, the control unit 16 includes a case 23. The case 23 includes a base 24 and a box-shaped cover 25. An opening 23*a* is formed in the lower side of the cover to permit a wiring harness (not shown) to pass through. The base 24 is fastened to the support members 21 by bolts (not shown). The cover 25 is fixed to the base 24 by screws 27. As shown in FIG. 4, a circuit board 31 and a yaw rate sensor 30 are housed in the case 23. The circuit board 31 and the sensor 30 are side by side.

As shown in FIG. 1, a rim 28 is formed on the surface of the base 24. The rim 28 extends along the edge of the base 24. A groove 29 is formed adjacent to and outside of the rim 28. A packing 26 is fitted in the groove 29. The inner surface of the cover 25 is fitted to the rim 28 and the end of the cover 25 contacts the packing 26. In this state, the cover 25 is fastened to the base 24. The packing 26 prevents water from entering the interior of the control unit 16 between the base 24 and the cover 25.

As shown in FIG. 4, the yaw rate sensor 30 and circuit board 31, which function as a controller, are located adjacent to each other in the case 23. The case 23 prevents the yaw rate sensor 30 and the circuit board 31 from getting wet.

The circuit board 31 is fastened to supporting projections 32 by screws 33. An electrical circuit of an axle locking mechanism is formed on the circuit board 31. The axle locking mechanism computes lateral acceleration based on the yaw rate acting on the forklift 10 and the speed of the forklift 10. The mechanism locks the rear axle, which is pivotally supported on the body frame 11, against pivoting based on the calculated lateral acceleration. A connector 34 is provided on the circuit board 31. A mating connector (not shown) of the wiring harness passing through the opening 23*a* is connected to the connector 34, which connects the harness to input and output terminals of the axle locking mechanism.

As shown in FIG. 1, the yaw rate sensor 30 is mounted on a bracket 35. The bracket 35 is supported on a pair of upper projections 36 and a pair of lower projections 37. The upper projections 36 are relatively short and the lower projections 37 are relatively long. Thus, the bracket 35 is not parallel to the surface of the base 24, and the reference axis of the yaw rate sensor 30 is vertical when the unit 16 is attached to the front protector 17, which is inclined. Lead wires 38 through which the sensor 30 sends the detection values are connected to the circuit board 31 in the case 23 (see FIG. 4).

The characteristics of the above described sensor mounting structure will now be described.

While the forklift 10 is moving, the yaw rate sensor 30 continuously detects the yaw rate and outputs the detection values to the circuit board 31. The circuit board 31 also receives signals indicating the vehicle speed. The circuit board 31 computes the lateral acceleration based on the yaw rate and the vehicle speed and outputs a control signal based on the lateral acceleration to a lock cylinder. For example, if the lateral acceleration exceeds a predetermined value when the forklift 10 is turning, the lock cylinder locks the rear axle against pivoting, which stabilizes the forklift 10.

If the temperature of the engine 15 increases, the hood 14 prevents the engine heat from escaping. The instrument panel 18, the kick board 19 and the toe board 20, which encompasses the case 23 accommodating the yaw rate sensor 30, are far from the engine 15. The engine 15 therefore does not heat the panel 18 and the boards 19, 20. Thus, the temperature of the case 23 is not increased by the heat of the engine 15.

If the forklift 10 is used in a high temperature environment, the ambient heat increases the temperature of the instrument panel 18, the kick board 19 and the toe board 20. In this case, the case 23 prevents the heat from being transferred to the yaw rate sensor 30. That is, the temperature of the yaw rate sensor 30 is not significantly affected by the ambient temperature.

If the forklift 10 is used in a low temperature environment, the temperature of the front protector 17, the instrument panel 18, the kick board 19 and the toe board 20 is lowered. In this case, the temperature of the yaw rate sensor 30 is not significantly lowered.

If the forklift 10 is operated in heavy rain or when the forklift 10 is washed with highly pressurized water, water will reach the front protector 17, the instrument panel 18, the kick board 19 and the toe board 20 from all the directions. However, the inner space 22 accommodating the case 23 is almost completely sealed by the front protector 17, the instrument panel 18, the kick board 19 and the toe board, which prevents the case 23 from becoming wet. Further, even if water enters the space 22 when the forklift 10 is washed with pressurized water and the water reaches the case 23, the water is prevented from entering the case 23 since the case 23 is waterproof.

The sensor mounting structure of FIGS. 1 to 4 has the following advantages.

(1) The waterproof case 23 is located in the space 22, which is sealed by the instrument panel 18, the kick board 19 and the toe board 20. The yaw rate sensor 30 is accommodated in the case 23. In other words, the yaw rate sensor 30 is double-sealed from the engine 15 and the exterior of the forklift 10. The temperature of the sensor 30 is therefore not significantly increased or decreased by the engine or the ambient temperature, which allows the sensor 30 to properly operates with adequate sensitivity. Further, even if the forklift 10 is used in heavy rain or is being washed with pressurized water, the yaw rate sensor 30 is prevented from becoming wet. The sensor 30 thus operates properly.

(2) The yaw rate sensor 30 is located at the rear surface 17*a* of the front protector 17 and is relatively far from the engine 15, which is a heat source. In other words, the covering structure for the sensor 30 is hardly influenced by the heat of the engine 15. The yaw rate sensor 30 is therefore insulated from the heat of the engine 15.

(3) The yaw rate sensor 30 is housed in the waterproof case 23. Therefore, the yaw rate sensor 30 remains dry regardless of the conditions when the case 23 is being attached to the front protector 17. Thus, the yaw rate sensor 30 is easily mounted on the body frame 11.

(4) The case 23 is supported on the supports 21 such that the case 23 does not directly contact the front protector 17. Even if the temperature of the front protector 17 is raised or lowered by the ambient temperature, the case 23 is not significantly heated or cooled. As a result, the temperature of the yaw rate sensor 30 does not vary significantly.

(5) The yaw rate sensor 30 is accommodated in the case 23 of the control unit 16, which eliminates the necessity for a case exclusively designed for accommodating the sensor 30.

The lead wires 38 of the yaw rate sensor 30 are connected to the circuit board 31 in the case 23. Therefore, when the case 23 is attached to the front protector 17, wiring for the sensor 30 is not needed. Accordingly, the installation of the case 23 is facilitated.

(6) The yaw rate sensor 30 is protected from water and heat, which improves the detection accuracy of the sensor 30. Accordingly, various controls performed based on detection values of the sensor 30 will be accurate.

Figure 5:
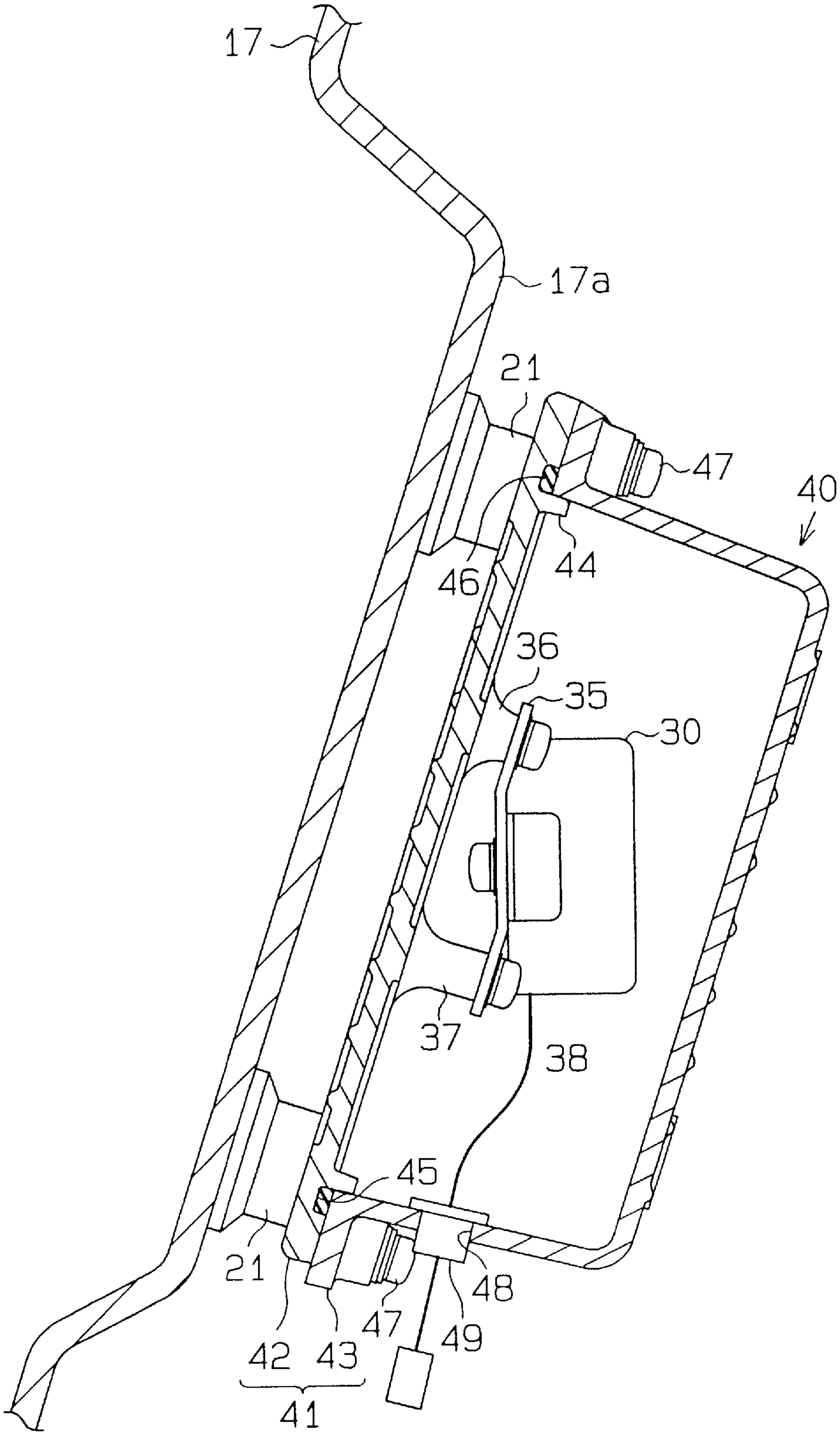
FIG. 5 is a cross-sectional view illustrating a mounting structure of a yaw rate sensor according to a second embodiment.

A second embodiment of the present invention will now be described with reference to FIG. 5. The embodiment of FIG. 5 is different from the embodiment of FIGS. 1 to 4 in that the yaw rate sensor 30 accommodated in the case 23 of the control unit 16 is replaced with a sensor unit 40, which is separated from the control unit 16. Therefore, like or the same reference numerals are given to those components that are like or the same as the corresponding components of FIGS. 1 to 4.

FIG. 5 illustrates a cross-section of the sensor unit 40. The sensor unit 40 has a case 41, which includes a base 42 and a cover 43.

A rim 44 formed on the surface of the base 42. The rim 44 extends along the edge of the base 42. A groove 45 is formed adjacent to and outside of the rim 44. A packing 46 is fitted in the groove 45. The inner surface of the cover 43 is fitted to the rim 44 and the end of the cover 43 contacts the packing 46. In this state, the cover 43 is fastened to the base 42 with screws 47. The packing 46 prevents water from entering the interior of the sensor unit 40 between the base 42 and the cover 43.

A hole 48 is formed in the lower side of the cover 43 to permit a lead wire 38 to pass through from the exterior. The base 42 is fastened to the support members 21 by bolts (not shown). The space between the wire 38 and the hole 48 is made waterproof by a sealing member 49.

The characteristics of the mounting structure of FIG. 5 will now be described.

If the forklift 10 is used in a high temperature environment, the ambient heat increases the temperature of the instrument panel 18, the kick board 19 and the toe board 20. The case 41 prevents the heat from being transferred to the yaw rate sensor 30. Likewise, even if the ambient temperature is low, the temperature of the yaw rate sensor 30 is not significantly lowered.

If water is splashed on the front protector 17, the instrument panel 18, the kick board 19 and the toe board 20, the case 41 remains dry. Even if the case 41 gets wet, water does not enter the interior of the case 41. That is, the yaw rate sensor 30 does not become wet with water from outside of the forklift 10.

In addition to the advantages (1), (2), (3), (4) and (6) of the structure of FIGS. 1 to 4, the sensor mounting structure of FIG. 5 has the following advantages.

(7) The yaw rate sensor 30 is accommodated in the case 41, which is separated from the control unit 16. This structure adds to the flexibility of the design.

The mounting structure of FIGS. 1 to 5 may be modified as follows.

Figure 6:
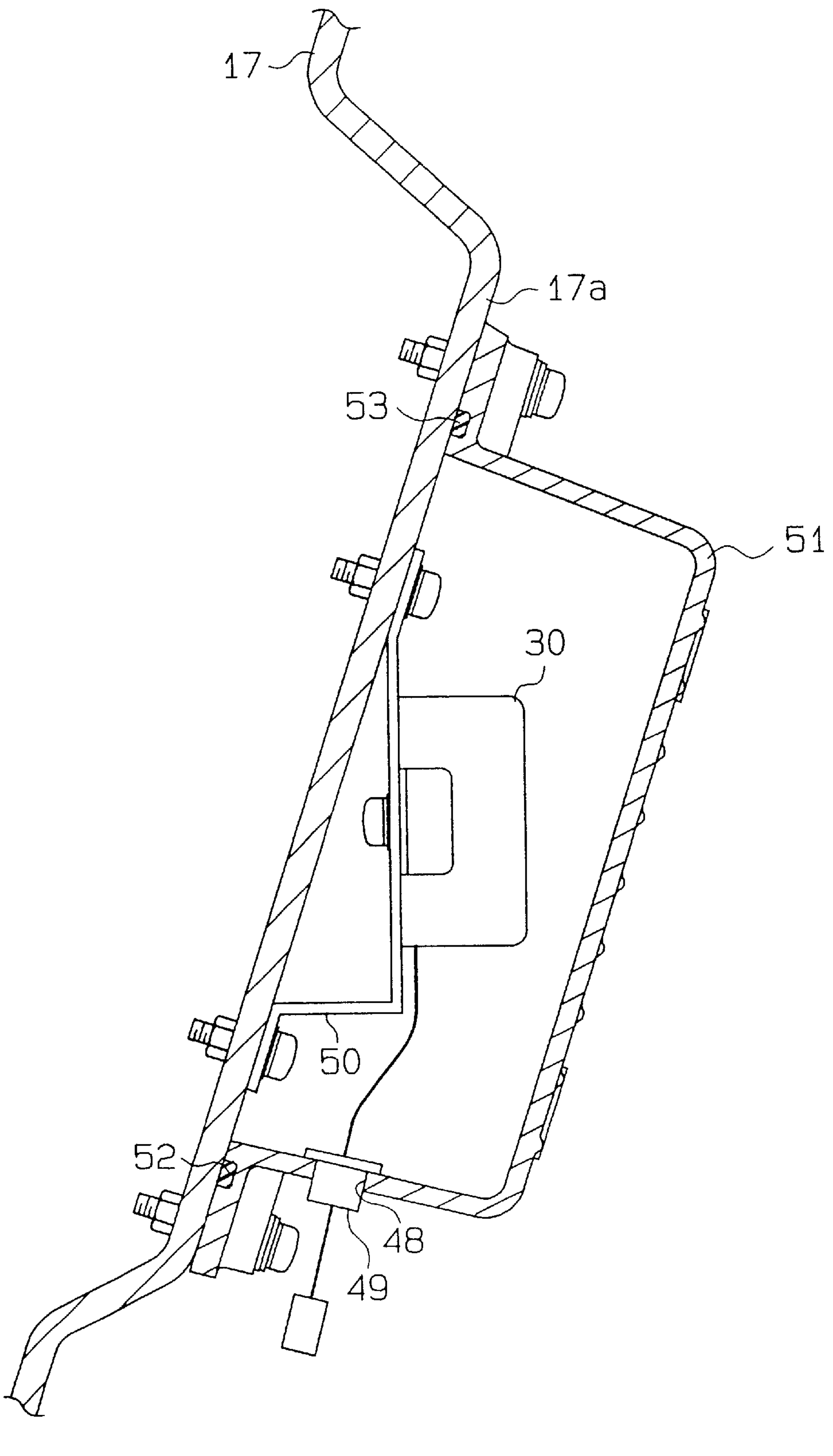
FIG. 6 is a cross-sectional view illustrating a mounting structure of a yaw rate sensor according to another embodiment.

The yaw rate sensor 30 may be housed in a covering member other than the cases 23, 41. For example, as shown in FIG. 6, the yaw rate sensor 30 may be covered by a cover 51. In this case, the sensor 30 is secured to a bracket 50, which is fixed to the rear surface 17*a* of the front protector 17. The cover 51 is secured to the rear surface 17*a* of the front protector 17 to cover the sensor 30. A groove 52 is formed in the flange of the cover 51 and a packing 53 is fitted in the groove 52. The packing 53 is pressed against the rear surface 17*a* of the front protector 17, which makes the sensor 30 waterproof.

The case 23 may be attached to the front protector 17 such that the base 24 directly contacts the rear surface 17*a* of the front protector 17.

A recess for accommodating the yaw rate sensor 30 may be formed in the rear surface 17*a* of the front protector 17, and the recess may be covered by a covering member such that the interior of the covering member is made waterproof.

Some forklifts have no kick board 19. In this case, the rear surface 17*a* of the front protector 17 is not covered. Even in such a forklift, the control unit 16 or the sensor unit 40 is sealed by the case 23 or 41, which protects the sensor 30 from extreme temperatures and water. That is, the kick board 19 is not necessary. In other words, the cases 23, 41 do not have to be completely covered.

Heat insulation such as glass wool may fill the space between the covering member (for example, the kick board 19) and the cover 23. The insulation effectively protects the sensor 30 from extreme temperatures. The circuit board 31 itself generates heat. Therefore, if the sensor 30 is housed in the case 23 of the control unit 16, the heat insulator is preferably located only at the side facing a heat source such as an engine, so that the heat of the circuit board 31 can dissipate.

The sensor 30 may be located in a place other than on the rear surface 17*a* of the front protector 17. If the forklift is battery powered, the sensor unit maybe located in a battery hood. Alternatively, a recess may be formed in a counterweight 11' and the recess may be covered by a lid to define a chamber for accommodating the sensor unit.

The present invention may be embodied in forklifts other than counterbalanced type as long as the sensor unit is located in a place in the body frame that is sealed from the outside of the vehicle.

The illustrated mounting structures may be used with sensors other than yaw rate sensors. For example, the illustrated mounting structures may be used for an acceleration sensor or an orientation sensor (geomagnetism sensor).

The illustrated mounting structures of FIGS. 1 to 6 may be used in other industrial vehicles that perform controls based on detection values of sensors. For example, the control unit mounting structures may be used in a tractor shovel or a shovel loader.

A further embodiment of the present invention will now be described with reference to FIGS. 7 to 12. The embodiment of FIGS. 7 to 12 is different from the embodiment of FIGS. 1 to 4 in that the bracket 35 is replaced by a bracket 35', which is a vibration insulator. Like or the same reference numerals are given to those components that are like or the same as the corresponding components of FIGS. 1 to 4, and the bracket 35' will mainly be described.

Figure 7:
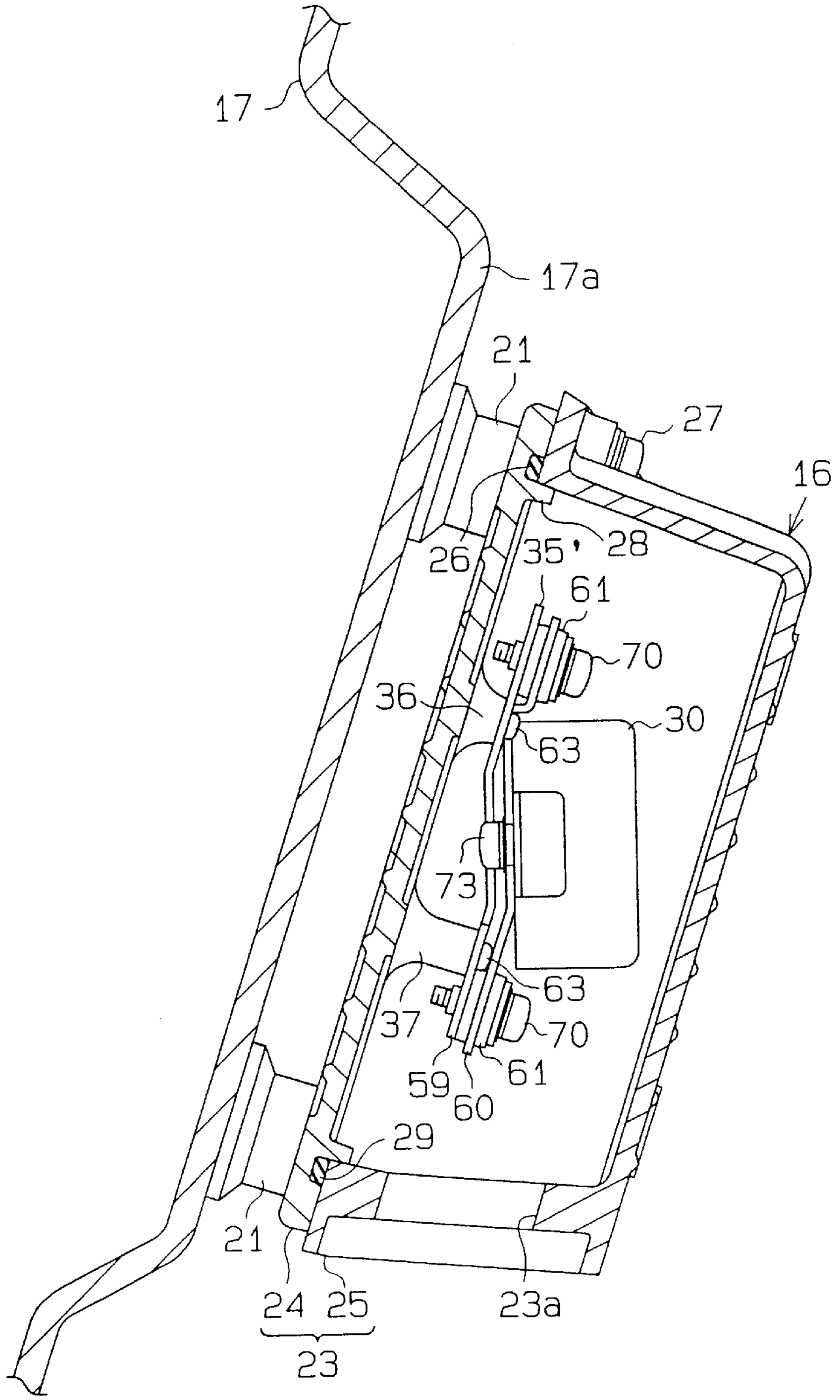
FIG. 7 is a cross-sectional view illustrating a yaw rate sensor mounting structure according to a further embodiment.
Figure 8:
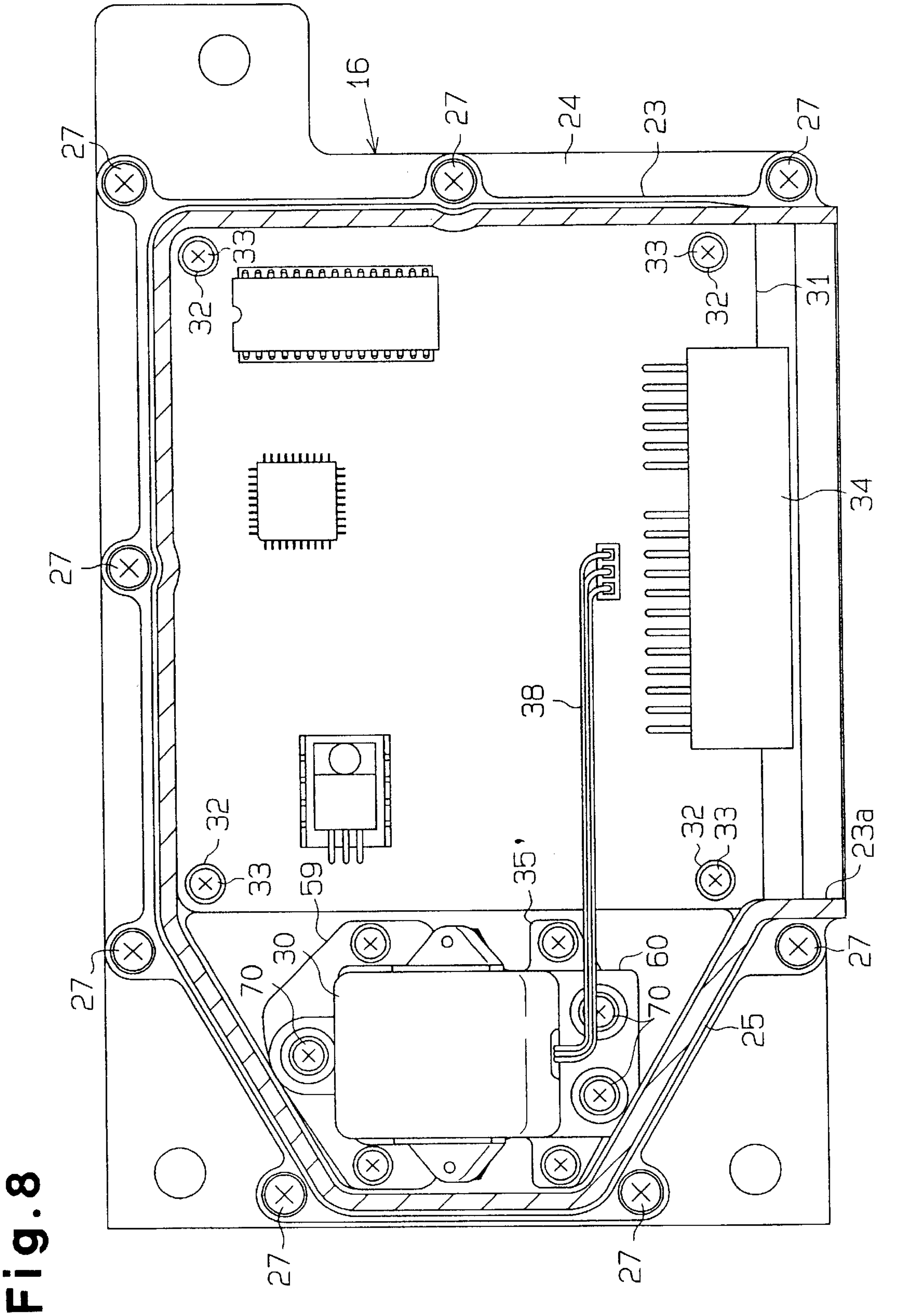
FIG. 8 is a cross-sectional view illustrating the control unit of FIG. 7.

FIGS. 7 and 8 are drawings like FIGS. 1 and 4. The bracket 35' illustrated in FIG. 7 and 8 is different from the bracket 35 of FIGS. 1 and 4.

Figure 9A:
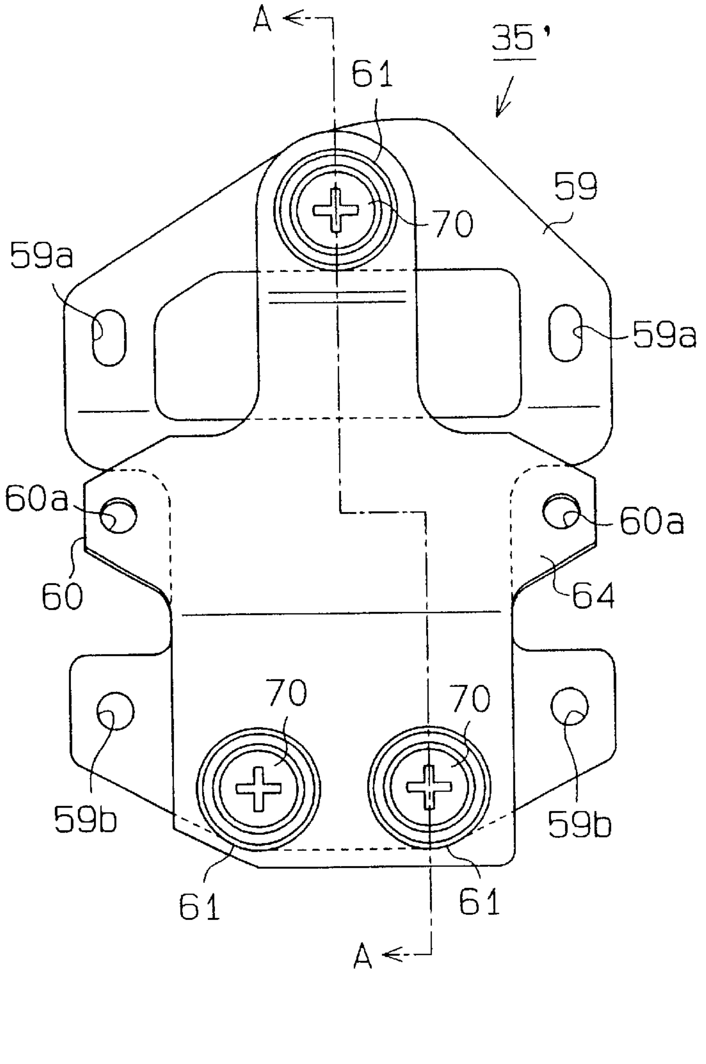
FIG. 9A is a front view of a bracket.
Figure 9B:
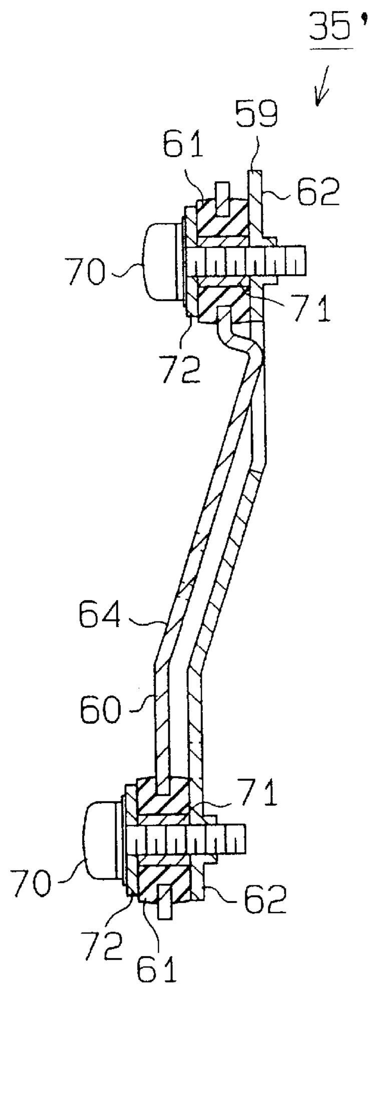
FIG. 9B is a cross-sectional view taken along line A—A of FIG. 9A.

FIGS. 9A and 9B illustrate the bracket 35'. The bracket 35' includes a securing plate 59, a mount plate 60 and three insulators 61. The insulators 61 are cylindrical and are made from high damping rubber. The insulators 61 are fitted to three parts of the mount plate 60. A collar 71 is press fitted in each insulator 61. A screw 70 is inserted in each collar 71. A washer 72 is located between the head of each screw 70 and the associated insulator 61. Each screw 70 is threaded to the securing plate 59, which secures the mount plate 60 to the securing plate 59 with an insulator 61 in between.

The securing plate 59 has holes 59*a*, 59*b*. The holes 59*a* are elongated. A screw 63 is inserted into each of the holes 59*a*, 59*b* (see FIG. 7), which secures the bracket 35' to supports 36, 37. Two holes 60*a* are formed in the mount plate 60. A screw 43 is inserted into each hole 60*a* and is screwed to the yaw rate sensor 30, which fixes the sensor 30 to the mount plate 60.

Figure 10:
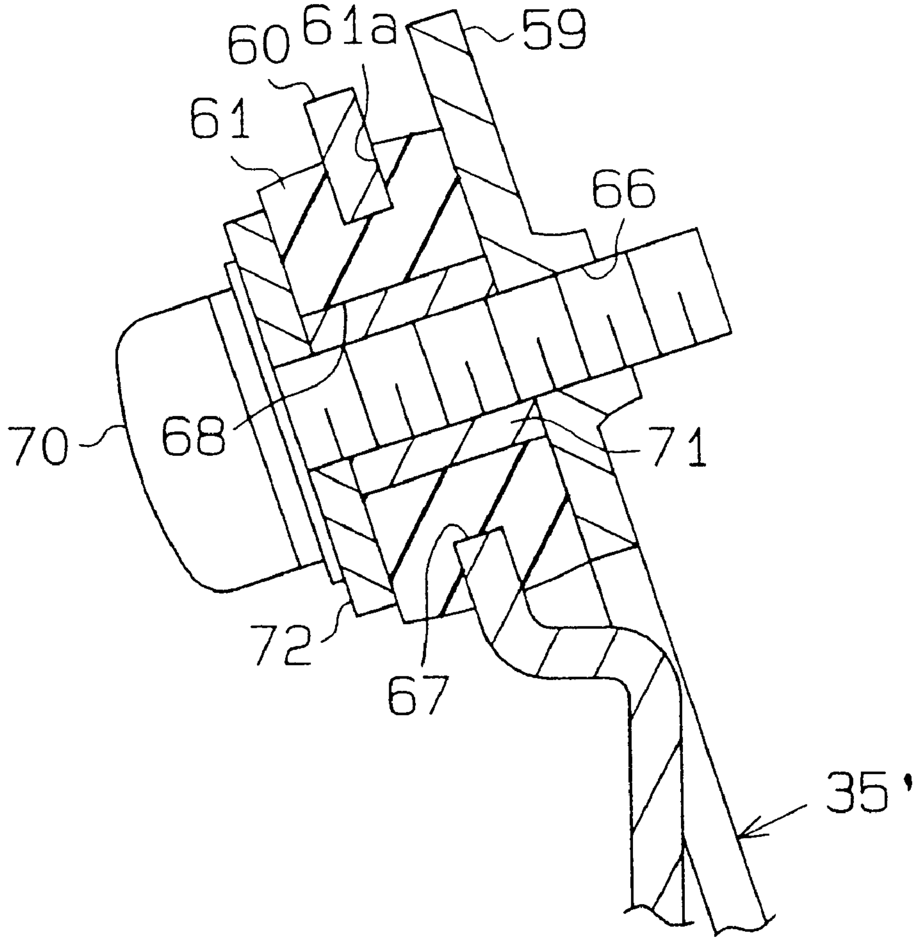
FIG. 10 is an enlarged, partial cross-sectional view of the bracket of FIG. 9A.

The mounting structure of the insulators 61 will now be described with reference to FIG. 10. FIG. 10 is across-sectional view showing one of the insulators 61. Threaded holes 66 are formed in the securing plate 59. Through holes 67 are formed in the mount plate 60. Each through hole 67 corresponds to one of the threaded holes 66. Each insulator 61 is fitted in one of the through holes 67. A groove 61*a* is formed in the periphery of the insulator 61. The groove 61*a* holds the rim of the hole 67. A hole 68 is formed axially in the insulator 61. The collar 71 is fitted in the hole 68. A screw 70 is inserted in the collar 71. A washer 72 is located between the head of the screw 70 and the collar 71. The distal end of the screw 70 is threaded to the threaded hole 66. The axial dimension of the insulator 61 is longer than that of the collar 71 so that the insulator 61 is axially compressed when the screw 70 is threaded. The other insulators 61 are installed between the plates 59 and 60 in the same manner. In this manner, the yaw rate sensor 30 is mounted on the case 23, that is, on the body frame 11 by the bracket 35', such that vibration of the body frame 11 is not transmitted to the sensor 30. Further, since the plate 60 is coupled to the securing plate 59 with the insulators 61 in between, the plate 60 is electrically insulated from the securing plate 59.

The characteristics of the high damping rubber forming the insulators 61 will now be described. The body frame 11, the yaw rate sensor 30 and the insulators 61 in between form a vibrating system. The high damping rubber has vibration transmitting characteristics shown in the graph of FIG. 11.

Figure 11:
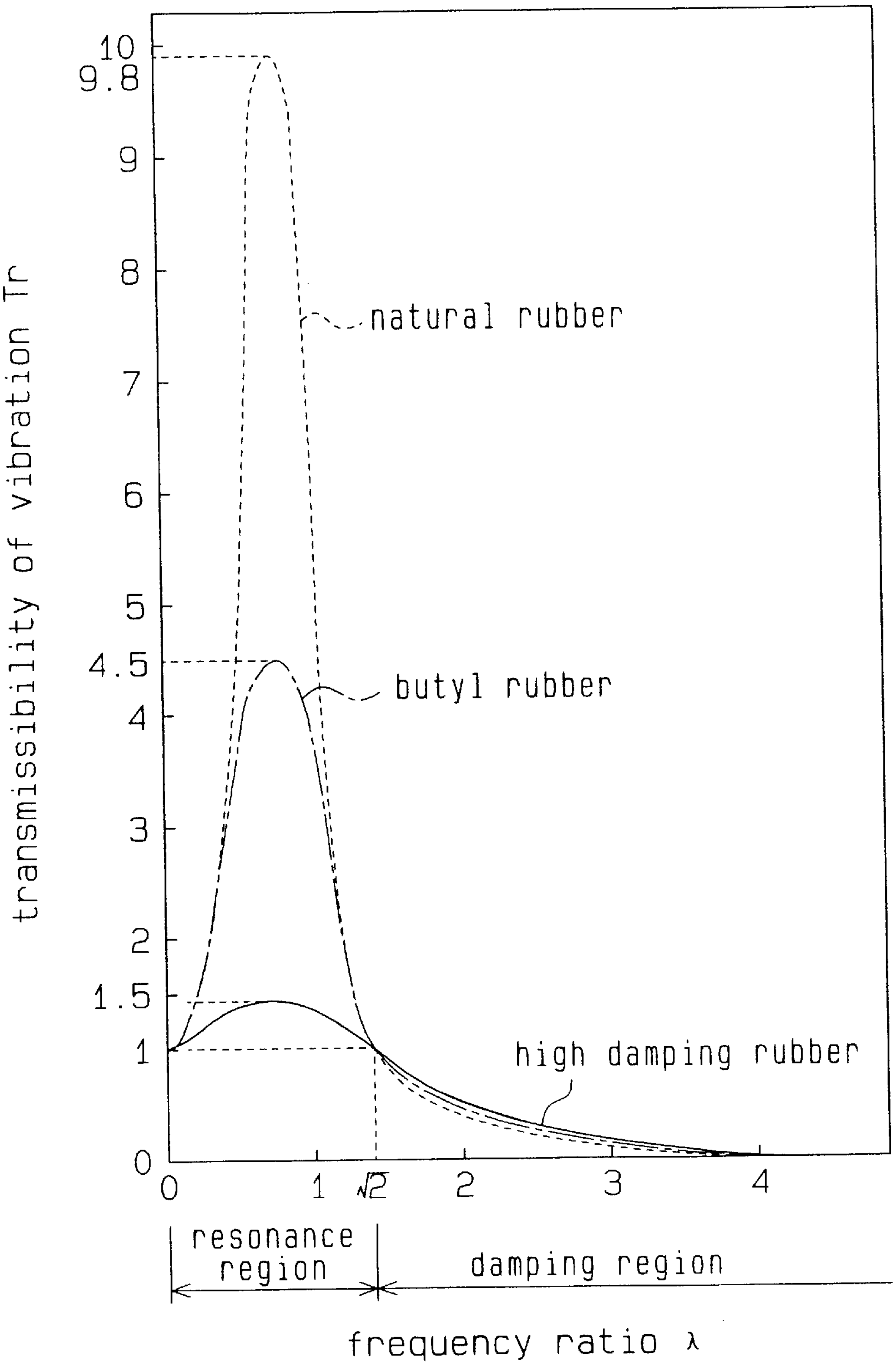
FIG. 11 is a graph showing the relationship between frequency ratio and transmissibility of vibration.

In FIG. 11, the horizontal axis represents a frequency ratio $\lambda(\lambda=f/fn)$, in which fn is the natural frequency of the vibrating system and f is the frequency of vibration generated in the body frame 11. The vertical axis represents a transmissibility Tr vibration (Tr=A/A0), in which A is the amplitude of the vibration transmitted to the yaw rate sensor 30 and A0 is the amplitude of the vibration generated in the body frame 11. That is, the transmissibility Tr is a ratio of the magnitude of the vibration in the yaw rate sensor 30 to the magnitude of the vibration in the body frame 11. The natural frequency fn of the vibrating system is determined by a ratio K/M, in which M is the weight of the yaw rate sensor 30 and K is the dynamic spring constant of the insulator 61. Specifically, the natural frequency fn is represented by an equation $fn=\frac{1}{2}\pi\times\sqrt{(K/M)}$. As shown in FIG. 11, when the frequency ratio $\lambda$ is equal to or less than $\sqrt{2}$, the transmissibility Tr is equal to one or greater. This region is referred to as a resonance region. When the ratio $\lambda$ is greater than $\sqrt{2}$, the ratio transmissibility Tr is less than one. This region is referred to as a damping region.

The transmissibility Tr of vibration of the high damping rubber is the same as that of natural rubber and butyl rubber in the damping region. However, the transmissibility Tr of the high damping rubber is substantially less than 1.5 in the resonance region. That is, the high damping rubber has significant damping characteristics in the resonance region.

Figure 12:
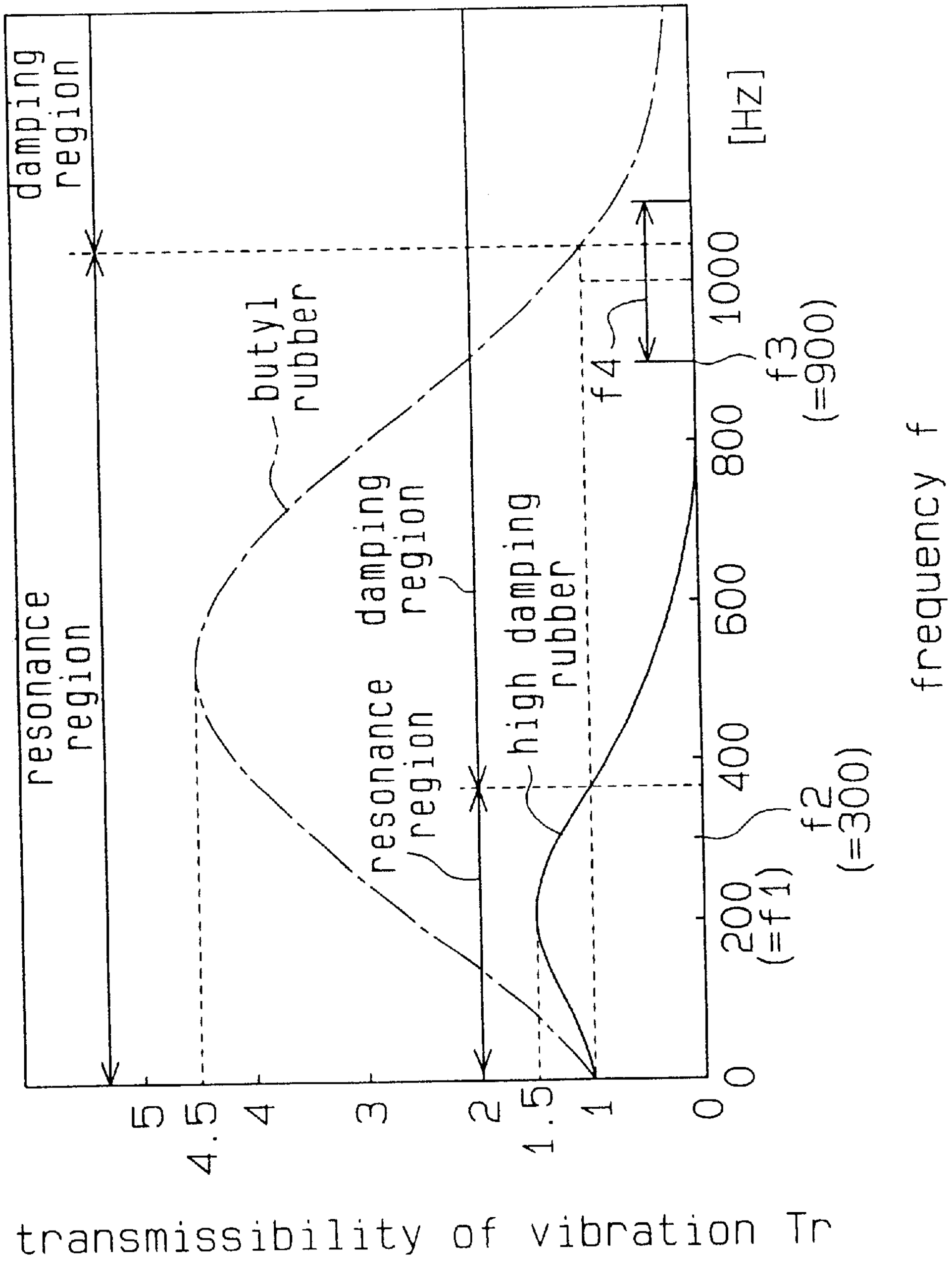
FIG. 12 is a graph showing the relationship between frequency and transmissibility of vibration.

FIG. 12 is a graph showing the vibration transmitting characteristics of the vibrating system. The horizontal axis represents the frequency f of the vibration generated in the body frame, and the vertical axis represents the transmissibility Tr of vibration.

If high damping rubber is used, the resonance region is lower than a frequency f of about 400 Hz, and the maximum value of the transmissibility Tr in the resonance region is approximately 1.5. In a part of the damping region over 400 Hz, the transmissibility Tr is smaller than one and decreases as the frequency f increases. On the other hand, if the insulators 61 are made of butyl rubber, the resonance region is extended to 1000 Hz and the maximum value of the transmissibility Tr is about 4.5. Although not shown in the graph, the resonance region is extended to 1000 Hz, and the maximum value of the transmissibility Tr is about 9.8 if the insulators 61 are made of natural rubber. The maximum frequency (about 350 to 400 Hz) in the resonance region of the high damping rubber is smaller than the maximum frequency (over 1000 Hz) in the resonance region of the butyl rubber. This is because the spring constant of the high damping rubber is smaller than that of the butyl rubber, and therefore the natural frequency of the vibrating system is small.

The high damping rubber has a relatively low transmissibility Tr, between 1 and 1.5, for low frequencies (for example, values smaller than 200 Hz) that affect the sensivility of the yaw rate sensor 30. If the insulators 61 are made of butyl rubber, the transmissibility Tr corresponding to frequencies smaller than 200 Hz exceeds 1.5.

The yaw rate sensor 30 itself has natural frequencies. Specifically, the sensor 30 has natural frequencies f1, f2, f3 along X, Y, Z axes (for example, about 200 Hz, 300 Hz, 900 Hz along the X axis, the Y axis, the Z axis, respectively). The high damping rubber has transmissibilities Tr smaller than 1.5 for each of natural frequencies f1, f2, f3. If the insulators 61 are made of butyl rubber, the transmissibility Tr corresponding to frequency of 200 Hz exceeds 2, the transmissibility Tr corresponding to frequency of 300 Hz exceeds 3, the transmissibility Tr corresponding to frequency of 900 Hz exceeds 2.

An impact wrench used for fastening the control unit 16 to the body frame 11 with bolts has a frequency f4, which is typically between 900 and 1100 Hz (some impact wrenches have a frequency between 400 and 1100 Hz). In this frequency range, the high damping rubber has a transmissibility Tr of a value smaller than 1. On the other hand, if the insulators 61 are made of butyl rubber, the transmissibility Tr for about 1000 Hz is over 1.

The characteristics of the sensor mounting structure of FIGS. 7 and 10 will now be described.

When installing the control unit 16 to the front protector 17 (see FIG. 7) with bolts, an impact wrench is used. At this time, the impact wrench repeatedly applies vibration to the case 23. The vibration applied to the case 23 is transmitted to the yaw rate sensor 30 via the bracket 35'. Specifically, the vibration is transmitted from the securing plate 59, which is secured to the body frame 11, to the mount plate 60, to which the sensor 30 is fixed, through the insulators 61.

The insulators 61, which are made of high damping rubber, lower the transmissibility Tr of the frequency f4 (about 900 to 1100 Hz) of the vibration from the impact wrench to a value lower than one. In other words, the vibration from the impact wrench to the body fame 11 is damped before being transmitted to the yaw rate sensor 30.

Like the vibration generated by the impact wrench, vibration generated in the body frame 11 is transmitted to the yaw rate sensor 30 via the insulators 61 when the forklift 10 is moving.

Prior art insulators are made of natural rubber or butyl rubber. Vibrations generated in the body frame 11 having certain frequencies cannot be damped by the prior art insulators. However, the insulators 61 of FIGS. 7 to 10 decrease the magnitude of vibration generated in the yaw rate sensor 30 to less than one and half times the amplitude of the vibration generated in the body frame 11. Specifically, the prior art rubber cannot damp vibration of 400 to 1000 Hz, while the insulators 61 can. As for vibrations having frequencies lower than 400 Hz, the amplification is suppressed compared to the prior art.

The transmissibilities Tr corresponding to the natural frequencies of the yaw rate sensor 30 are less than 1.5. Therefore, even if the frequency f of vibration transmitted from the body frame 11 is equal to one of the natural frequencies of the yaw rate sensor 30, the amplification of the vibration due to resonance is suppressed compared to the prior art. Further, vibrations having a frequency matching the natural frequency f3 in the Z axis are damped.

As in the case of insulators made of natural rubber or butyl rubber, the insulators 61, which are made of high damping rubber, greatly suppress vibrations having a frequency f that is higher than the maximum frequency in the resonance frequency range. Specifically, the higher the frequency f is, the more suppressed the vibration is. Therefore, the insulators 61 suppress the magnitude of vibrations in the body frame 11 having relatively high frequency f. The resultant vibration transmitted to the yaw rate sensor 30 has a low magnitude.

Vibrations having a relatively low frequency generated in the body frame 11 are also transmitted to the yaw rate sensor 30 via the insulators 61, since the transmissibility Tr is lower than 1.5 in the region lower than 200 Hz. That is, the amplitude of vibrations generated in the yaw rate sensor 30 is less than 1.5 times the amplitude of the vibration in the body frame 11. Therefore, the detection accuracy of the yaw rate sensor 30 is not significantly affected. In other words, the detection value of the sensor 30 is not significantly different from the actual yaw rate of the body frame 11.

Since the mount plate 60 is insulated from the securing plate 59, the yaw rate sensor 30 is electrically insulated from the body frame 11.

The sensor mounting structure of FIGS. 7 to 10 has the following advantages.

(1) Vibrations are transmitted to the yaw rate sensor 30 from the body frame 11 via the insulators 61. The insulators 61 are made of high damping rubber, which limits the maximum value of the transmissibility Tr of the vibration in the resonance region to 1.5. Therefore, the yaw rate sensor 30 is protected from vibrations from the body frame 11 having a relatively low frequency.

The mounting structure allows the yaw rate sensor 30 to accurately detect the yaw rate, which improves the reliability of controls performed based on detection value of the yaw rate sensor 30.

(2) The transmissibilities Tr of vibrations having the natural frequencies of the yaw rate sensor 30 are lower than 1.5. Thus, even if the frequency of vibration transmitted from the body frame 11 is equal to one of the natural frequencies of the yaw rate sensor 30, the yaw rate sensor 30 is not vibrated as strongly as in the prior art. The yaw rate sensor 30 is protected from vibrations having frequencies equal to one of the natural frequencies of the sensor 30.

(3) An impact wrench is used to fasten bolts to fix the control unit 16 to the body frame 11. The transmissibility Tr of the frequency of vibration transmitted from the impact wrench to the body frame 11 is less than one. Therefore, when an impact wrench is used to install the yaw rate sensor 30, strong vibrations due to resonance are not generated in the yaw rate sensor 30, which prevents damage to the yaw rate sensor 30.

(4) The detection value of the yaw rate sensor 30 is affected by vibrations of certain frequencies. The transmissibility Tr of such vibrations is lowered to below 1.5. Therefore, the detection values of the yaw rate sensor 30 contain no errors.

(5) The mount plate 60, to which the yaw rate sensor 30 is secured, is fixed to the securing plate 59 with the insulators 61 in between. This structure electrically insulates the yaw rate sensor 30 from the body frame 11. Thus, a body earth type yaw rate sensor may be used as the yaw rate sensor 30.

It should be apparent to those skilled in the art that the present invention may be embodied in many other specific forms without departing from the spirit or scope of the invention. Particularly, it should be understood that the invention may be embodied in the following forms.

The insulators 61 are made of high damping rubber. The maximum value of the transmissibility Tr of the insulators 61 in the resonance region may be higher than 1.5 as long as it is relatively low. For example, even if the maximum value of the transmissibility Tr is 2.0 in the resonance region, the yaw rate sensor 30 is prevented from being damaged by vibrations having a relatively low frequency.

The transmissibility Tr at the natural frequencies of the yaw rate sensors 30 may be higher than 1.5 as long as it is relatively low. For example, even if the transmissibility Tr is approximately 2.0, the yaw rate sensor 30 is prevented from being damaged by vibrations having one of the natural frequencies of the sensor 30.

The natural frequencies f1 to f3 of the yaw rate sensor 30 are 200 Hz, 300 Hz and 900 Hz, respectively, in the embodiment of FIGS. 7 to 10. The natural frequencies of a sensor are determined by the type of the sensor, and the present invention may be embodied in sensors having values of natural frequencies other than 200 Hz, 300 Hz and 900 Hz.

If an impact wrench is not used to install the sensor 30 to the body frame 11, the transmissibility Tr corresponding to the frequency of vibration generated by an impact wrench may be greater than one.

The vibration damping members are not limited to the insulators 61, which are made of high damping rubber. For example, plates made of high damping rubber may be attached to the inner surfaces of the base 24 and the cover 25, respectively, and the yaw rate sensor 30 may be sandwiched between the plates. This structure lowers the resonance region compared to the prior art and decreases the maximum value of the transmissibility Tr in the resonance region.

The vibration damping members may be rubber balls in which high viscosity fluid (for example, silicone oil) is sealed. In this case, a number of the rubber balls are secured on the inner walls of a case for accommodating the yaw rate sensor 30 such that the sensor 30 is supported by the rubber balls. In short, as long as the sensor 30 may be supported by any members that have characteristics comparable to those of the high damping rubber used in the illustrated embodiment.

Controls that are performed based on the yaw rate detected by the yaw rate sensor 30 are not limited to the locking control for the rear axle. For example, the maximum wheel angle of a power steering system may be limited when the yaw rate is greater than a predetermined reference value. Alternatively, an auxiliary power for steering may be controlled based on the yaw rate.

The mounting structure of the illustrated embodiments may be used to install sensors other than the yaw rate sensor 30. Specifically, the mounting structure may be used for a sensor that is likely to be damaged by vibration of its natural frequency or for a sensor that is likely to be damaged by vibration of an impact wrench. In these cases, the sensors are protected from vibrations transmitted from the body frame.

The mounting structure of the embodiment of FIGS. 8 to 10 is not limited to the case 23 for accommodating the control unit 16. The mounting structure of the embodiment of FIGS. 8 to 10 may be used in the case for accommodating only a sensor 30 as shown in FIG. 5.

The mounting structure of the embodiment of FIGS. 7 to 10 is not limited to the mounting structure for supporting the yaw rate sensor 30 housed in the case 23. However, the structure may be used in the structure for directly attaching the yaw rate sensor 30 to the rear surface 17*a* of the front protector 17.

The illustrated embodiment 7 to 10 may be used in other industrial vehicles that perform controls based on detection values of sensors. For example, the embodiment may be used in a tractor shovel and a shovel loader.

The sensor mounting structure of the present invention may be embodied in industrial vehicles other than loading vehicles, for example, construction vehicles and civil engineering vehicles.

The sensor mounting structure of the present invention may be embodied in vehicles other than industrial vehicles, for example, passenger cars and commercial vehicles.

It should be apparent to those skilled in the art that the present invention may be embodied in many other specific forms without departing from the spirit or scope of the invention. Therefore, the present examples and embodiments are to be considered as illustrative and not restrictive and the invention is not to be limited to the details given herein, but may be modified within the scope and equivalence of the appended claims.

What is claimed is:

1. A mounting structure for a sensor in a vehicle, wherein the vehicle includes an enclosure forming a closed space, the mounting structure comprising:

a sensor for detecting a value representing a vehicle characteristic to control the vehicle, the sensor has a natural frequency; and a water resistant case mounted to the vehicle, wherein the sensor is located inside the case, and the case is mounted to the vehicle within the closed space, the case comprises a flat base portion having a plurality of supporting members protruding toward the interior of the case, a box-shaped lid, and a packing located between the base portion and the lid to seal the interior of the case against water, the plurality of supporting members having a bracket mounted to the distal portion thereof to support the sensor, and the bracket comprises a fixed plate fixed to the supporting member, a mounting plate fixed to the sensor and a vibration damping member for connecting the mounting plate to the fixed plate to insulate the sensor from vibrations, wherein a vibration system is formed by the vehicle, the vibration damping member and the sensor, and wherein the vibration damping member is made such that the transmissibility of the vibration system is less than 2 at the natural frequency of the sensor.

2. A mounting structure as recited in claim 1, wherein the vibration damping member is made such that the maximum value of the transmissibility of the vibration system is less than 2.

3. A mounting structure as recited in claim 1, wherein the sensor includes a yaw rate sensor for detecting the yaw rate while the vehicle is turning, and wherein the vibration damping member is made such that the transmissibility of the vibration system is in the range of 1 to less than 1.5 at frequencies affecting the yaw rate detected by the yaw rate sensor.

4. A mounting structure as recited in claim 1, wherein the case contains a circuit board of a controller, the controller performing a vehicle control procedure on the basis of the value detected by the sensor.

5. A mounting structure for a sensor in a counter balance type forklift having a front protector, an instrument panel, a kick board and a toe board, wherein the forklift includes an enclosure forming a closed space formed by the rear surface of the front protector, the instrument panel, the kick board and the toe board, the mounting structure comprising:

a sensor for detecting a value representing a vehicle characteristic to control the vehicle; and a water resistant case mounted to the vehicle, wherein the sensor is located inside the case, and the case is mounted to the vehicle within the closed space.

6. A mounting structure as recited in claim 5, wherein the case is supported to the rear surface of the front protector via damping members.

7. A mounting structure as recited in claim 5, wherein the case is mounted directly to the rear surface of the front protector.

8. A mounting structure as recited in claim 5, wherein the case is formed by the rear surface of the front protector and a cover that covers a portion of the rear surface of the front protector, and a bracket is fixed to the portion of the front protector, the sensor being fixed to the bracket.

9. A mounting structure for a sensor in a vehicle, comprising:

a sensor for detecting a value representing a vehicle characteristic to control the vehicle, the sensor having a natural frequency; and a vibration damping member for supporting the sensor on the vehicle, wherein a vibration system is formed by the vehicle, the vibration damping member and the sensor, and wherein the vibration damping member is made such that the transmissibility of the vibration system is less than 2 at the natural frequency of the sensor.

10. A mounting structure as recited in claim 9, wherein the vibration damping member is made such that the maximum value of the transmissibility of the vibration system is less than 2.

11. A mounting structure as recited in claim 9, wherein the sensor includes a yaw rate sensor for detecting the yaw rate while the vehicle is turning, and wherein the vibration damping member is made such that the transmissibility of the vibration system is in the range of 1 to less than 1.5 at frequencies affecting the yaw rate detected by the yaw rate sensor.

* * * * *